(12) United States Patent
Devilliers et al.

(10) Patent No.: US 9,411,127 B2
(45) Date of Patent: Aug. 9, 2016

(54) HONEYCOMB STRUCTURE

(71) Applicant: THALES, Neuilly-sur-Seine (FR)

(72) Inventors: Christophe Devilliers, Grasse (FR); Aurelien Suau, Cannes (FR); Laurence Cornillon, Grasse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/572,612

(22) Filed: Dec. 16, 2014

(65) Prior Publication Data

US 2015/0168673 A1 Jun. 18, 2015

(30) Foreign Application Priority Data

Dec. 18, 2013 (FR) ...................................... 13 02976

(51) Int. Cl.
*G02B 7/183* (2006.01)
*G02B 7/192* (2006.01)
*G02B 5/08* (2006.01)

(52) U.S. Cl.
CPC ........ *G02B 7/183* (2013.01); *G02B 5/08* (2013.01); *G02B 7/192* (2013.01); *Y10T 428/24149* (2015.01)

(58) Field of Classification Search
CPC ................................ G02B 7/183; G02B 7/192
USPC ............................. 359/848; 428/73, 116, 118
See application file for complete search history.

(56) References Cited

U.S. PATENT DOCUMENTS

| | | | | |
|---|---|---|---|---|
| 3,453,041 A * | 7/1969 | Rantsch | .................. | G02B 5/08 359/848 |
| 3,600,257 A * | 8/1971 | Reinhardt | ............... | G02B 5/08 359/848 |
| 3,834,096 A * | 9/1974 | Becker | ................. | E04B 1/7092 52/172 |
| 4,489,234 A * | 12/1984 | Harnden, Jr. | ............. | B32B 3/12 219/460.1 |
| 4,670,338 A * | 6/1987 | Clemino | .................. | G02B 5/08 156/297 |
| 5,227,921 A | 7/1993 | Bleier et al. | | |
| 6,045,231 A | 4/2000 | Martineau | | |
| 6,064,352 A * | 5/2000 | Silverman | ........... | H01Q 15/142 343/897 |
| 2006/0012895 A1* | 1/2006 | Desmitt | ................ | G02B 7/183 359/848 |
| 2010/0226030 A1* | 9/2010 | Baldus | .................. | C04B 37/045 359/883 |

FOREIGN PATENT DOCUMENTS

DE  102009011863 A1  9/2010

* cited by examiner

*Primary Examiner* — Ricky D Shafer
(74) *Attorney, Agent, or Firm* — Baker & Hostetler LLP

(57) ABSTRACT

A honeycomb structure comprises a front part and a rear part. The front and rear parts are honeycomb structures composed of a skin and of stiffeners as a single component, the stiffeners being formed of intermeshing blades oriented substantially perpendicularly to said skin. The two parts comprise protuberances on the stiffeners on the face opposite to the skin and these protuberances are disposed on the front and rear parts in such a manner that each protuberance of the front part is located opposite a protuberance of the rear part when the two parts are superposed. The two parts are assembled by attachment devices into which two opposing protuberances are inserted.

10 Claims, 3 Drawing Sheets

HONEYCOMB STRUCTURE

CROSS-REFERENCE TO RELATED APPLICATION

This application claims priority to foreign French patent application No. FR 1302976, filed on Dec. 18, 2013, the disclosure of which is incorporated by reference in its entirety.

FIELD OF THE INVENTION

The present invention relates to the field of honeycomb structures and notably honeycomb structures for telescopes with a high or very high resolution. The present invention also relates to a mirror for example for such a telescope.

BACKGROUND OF THE INVENTION

The invention can for example be used in the construction of mirrors for telescopes with a high or very high resolution.

Telescopes for space applications carried by satellites require large mirrors that are ultra-stable and ultra-light. For this purpose, mirrors are commonly used whose structure is made of silicon carbide (SiC) or vitro-ceramic of the Zerodur® type Since weight is a handicap in the field of space applications, the mirrors are locally stiffened by a rear-mounted skin in order to reduce their mass. The drawback of attaching such a rear skin, even made of the same material as the stiffeners, is the nanometer-scale instability generated by the adhesive bonding providing the junction between the rear skin and the mirror. A known solution is to bond the rear skin onto the top edge of the stiffeners, but during the drying and the polymerization, the adhesive generates, by its swaging, a significant deformation and notably stresses internal to the adhesive. When aging, the adhesive gradually relaxes a part of the stresses and deforms the mirror.

Similarly, when the honeycomb structure of the mirror undergoes thermal cycling, the adhesive bond relaxes notably at the menisci resulting in a gradual freeing of the stresses and hence a very significant deformation of the polished mirror.

SUMMARY OF THE INVENTION

One aim of the invention is notably to correct the aforementioned drawbacks by providing a device allowing the stresses in the adhesive to be reduced.

For this purpose, one subject of the invention is a honeycomb structure comprising a part referred to as a 'front part' and a part referred to as a 'rear part' characterized in that:
- the "front" part and the "rear" part are honeycomb structures composed of a skin and of stiffeners as a single component, said stiffeners being formed of intermeshing blades oriented substantially perpendicularly to said skin,
- the "front" part and the "rear" part comprise protuberances on the stiffeners on the face opposite to the skin, said protuberances being disposed on said "front" part and "rear" part in such a manner that each protuberance of the "front" part is located opposite a protuberance of the "rear" part when the two parts are superposed,
- the "front" part and the "rear" part are assembled by means of an attachment device into which two opposing protuberances are inserted.

According to one variant embodiment, at least one protuberance of the honeycomb structure is disposed at the intersection of at least two stiffeners.

According to one variant embodiment, at least one protuberance of the honeycomb structure is bonded to the attachment device.

According to one variant embodiment, the adhesive joint is only distributed over a part of the periphery of the protuberances.

According to one variant embodiment, the protuberances are cylindrical stubs.

According to one variant embodiment, at least one attachment device is slotted at one of its ends at least.

According to one variant embodiment, the attachment device is a guide socket.

According to one variant embodiment, the attachment device is made of Invar®.

According to one variant embodiment, the attachment device is constructed with a ceramic material chosen from between silicon nitride and vitro-ceramic glass of the Zerodur® type.

Another subject of the invention is a mirror comprising a honeycomb structure (1) as claimed in one of the preceding claims characterized in that the reflecting part is formed by or on the skin of said honeycomb structure (1).

BRIEF DESCRIPTION OF THE DRAWINGS

Other features and advantages of the present invention will become more clearly apparent upon reading the description hereinafter, presented by way of non-limiting illustration and with reference to the appended drawings, in which.

DETAILED DESCRIPTION

The present invention relates to a honeycomb structure 1 composed of two parts 21, 22, a part 21, referred to as 'front part', and a part 22 referred to as 'rear part'. Each of the "front" and "rear" parts 21, 22 are composed of honeycomb structures. According to one embodiment, each of the parts 21, 22 of the honeycomb structure 1 is made of silicon carbide (SiC). According to another embodiment, the parts 21, 22 of the honeycomb structure 1 are made of vitro-ceramic glass of the Zerodur® type.

Figure 1:
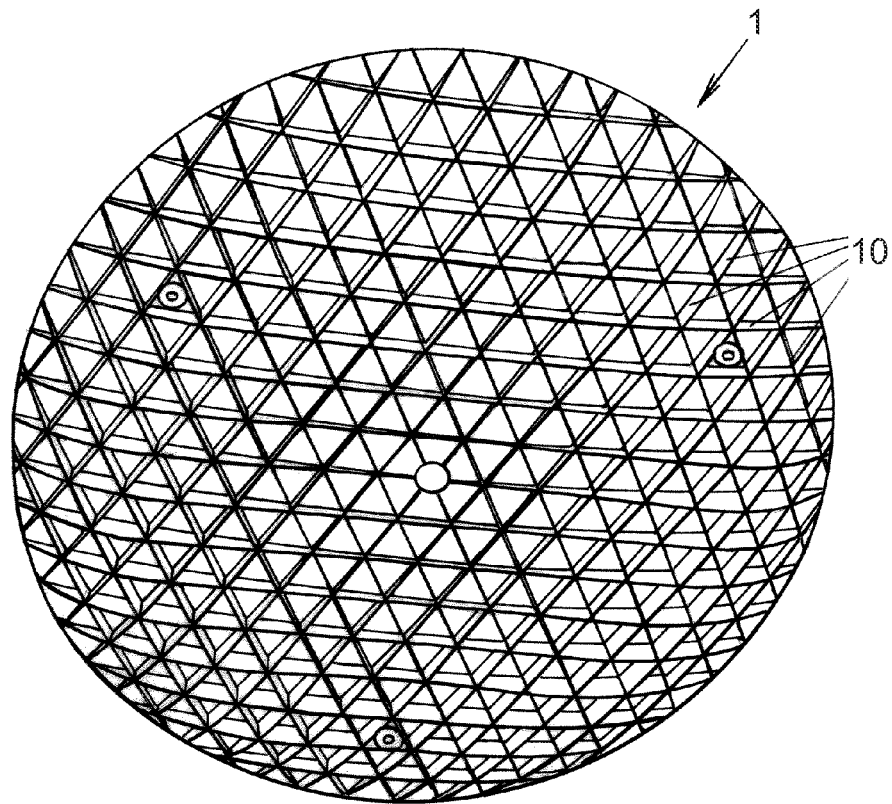
FIG. 1 shows one exemplary embodiment of a honeycomb structure according to the invention.

With reference to FIG. 1, each of the two parts 21, 22 of the honeycomb structure 1 comprises a skin 23 and stiffeners 10, the whole assembly forming a single structure, in other words a structure made as a single component. The stiffeners 10 and the skin 23 can, for example, be obtained by bulk machining, by molding or by any other equivalent means.

According to one embodiment, the stiffeners 10 can be formed of intermeshing blades oriented in a direction substantially perpendicular to the surface of the skin 23. Advantageously, these stiffeners 10 allow the front and rear parts of the honeycomb structure to be rigidified against mechanical stresses while at the same time lightening each part of said honeycomb structure 1.

Figure 2:
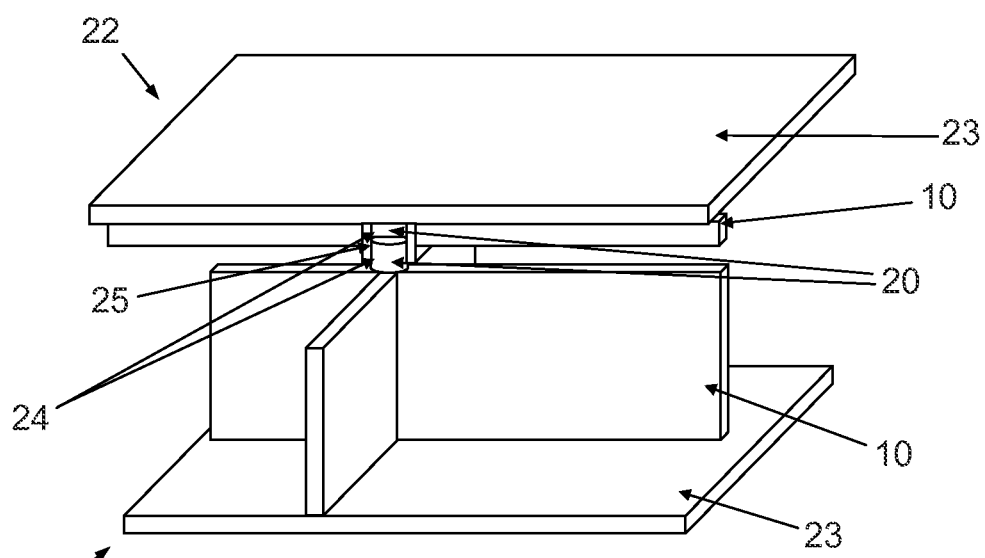
FIG. 2 shows one exemplary embodiment of the assembly of the two parts of a honeycomb structure according to the invention.

With reference to FIG. 2, each of the two front 21 and rear 22 parts comprises protuberances 20 on the face opposite to the skin 23. According to one embodiment, these protuberances 20 extend in a direction substantially perpendicular to the surface of the skin 23.

According to one particular embodiment, these protuberances 20 can take the form of a cylindrical stub.

The protuberances 20 can for example be formed during the machining of the stiffeners 10.

According to one exemplary embodiment illustrated in FIG. 2, the protuberances 20 are disposed at certain intersections of the blades forming the stiffeners on the face opposite to the surface forming the skin 23. These protuberances 20 can, for example, be formed during the machining of the stiffeners 10.

According to one particular embodiment, the protuberances 20 can be formed at each intersection of stiffeners 10.

The "front" part 21 and the "rear" part 22 are designed to be assembled together by means of the protuberances 20 formed in each of the front 21 and rear 22 parts. For this purpose, the protuberances 20 are disposed on each front and rear part in such a manner that each protuberance 20 of the "front" part 21 is located opposite a protuberance 20 of the "rear" part 22 when the two parts are superposed.

According to one embodiment, at least two opposing protuberances 20, designed to be assembled together, may not be symmetrical with respect to the junction point of the two protuberances 20. The two protuberances 20 may for example have different lengths and/or different diameters.

The assembly of the two front and rear parts is provided by attachment devices 25 into which the opposing protuberances 20 are inserted in pairs. The attachment device 25 can for example be made of Invar®, of silicon nitride (Si3N4) or of a vitro-ceramic of the Zerodur® type or any other equivalent material. The protuberances 20 can be bonded to the attachment device 25. According to one embodiment, the adhesive joint 24 is only distributed over the periphery of the protuberances 20.

Figure 3:
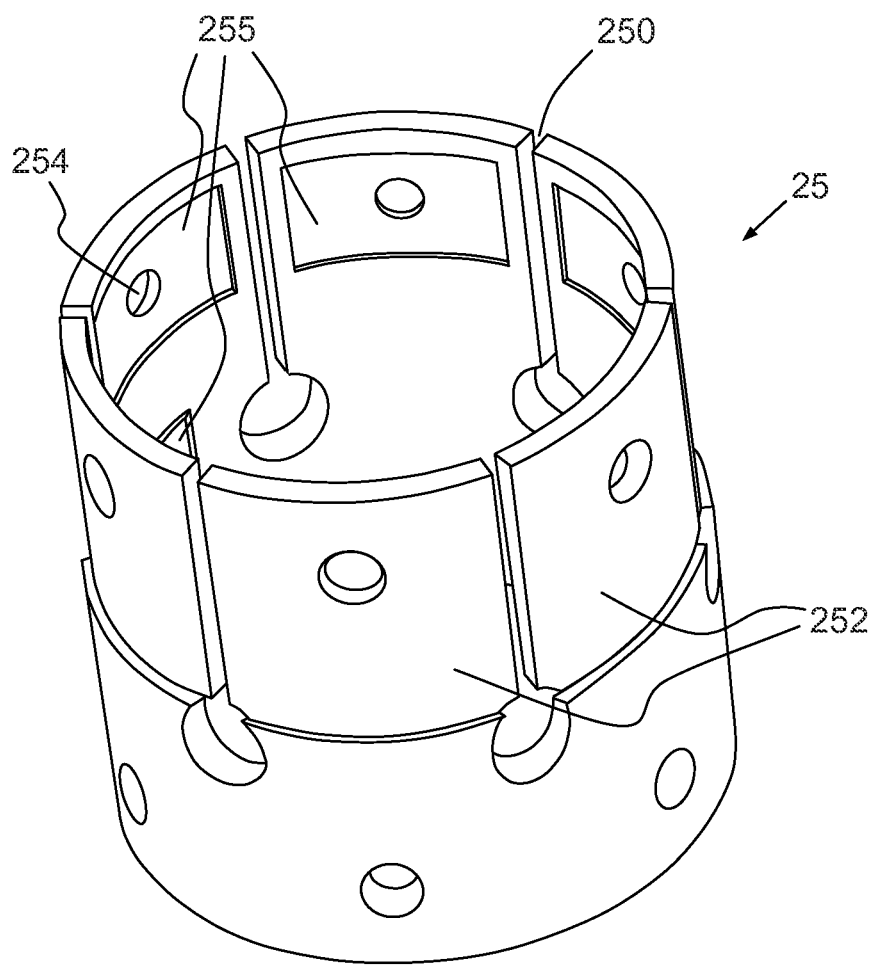
FIG. 3 shows one exemplary embodiment of an attachment device according to the inventions.
Figure 4:
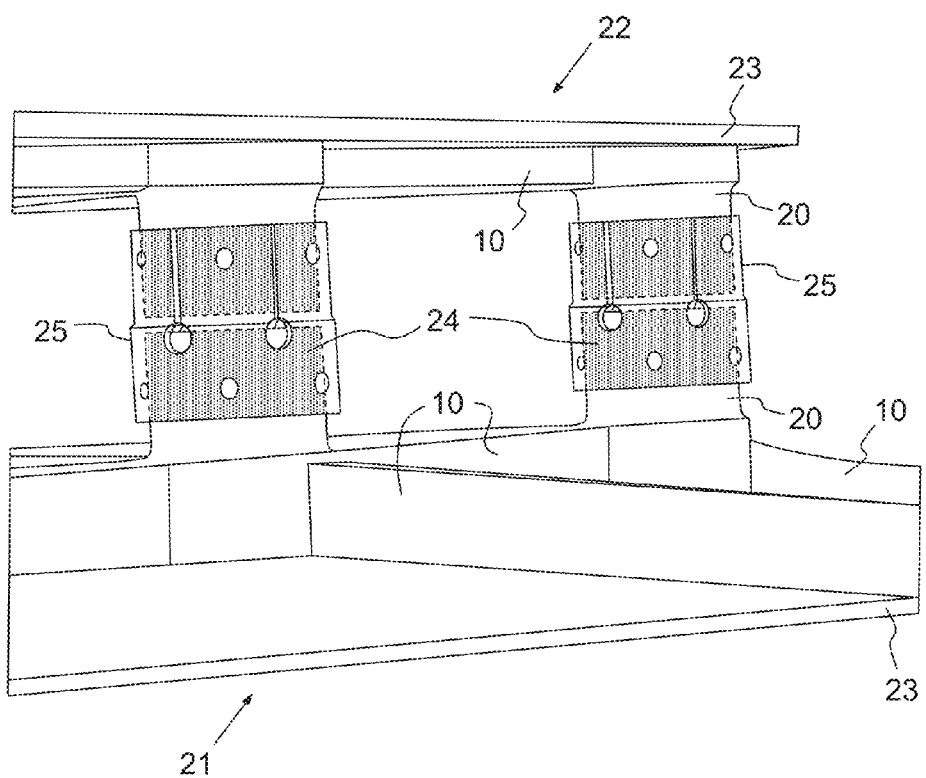
FIG. 4 is another view of the exemplary embodiment of the invention shown in FIGS. 1-3.

By way of illustration, FIG. 3 shows one exemplary embodiment in which the attachment device 25 is a guide socket.

In order to facilitate the insertion of the protuberances, at least one end of at least one attachment device 25 can be slotted. The slots 250 separate flexible blades 252. Advantageously, these slots 250 also allow a greater flexibility to be given to the end of the attachment device 25 and allow the attachment devices 25 to be adjusted to the protuberances 20.

In order to give a greater flexibility to the slotted end of the attachment device 25, the slotted part of said device 25 may be cut lower down.

According to one embodiment, at least one attachment device 25 can comprise various recesses 255 or depressions. These recesses may take the form of a blind cut-out. According to one embodiment, these recesses 255 can be disposed at the center of the flexible blades 252 in the part facing the protuberances 20. These recesses 255 are designed to receive the adhesive used to fix the protuberances 20. Thus, the adhesive is not located over the whole periphery of the protuberance but remains localized in the recesses 255. Advantageously, not applying adhesive to the whole periphery of the attachment device 25 allows the quantity of adhesive used to be minimized. This also allows the attachment device 25 to conserve flexibility in order to compensate for any defects in shape of the attachment device 25 and/or of the protuberances 20. In addition, when the adhesive absorbs humidity, it swells up and tends to push the flexible blades 252 away from the attachment device 25 and/or the protuberances 20. The flexibility of the attachment device 25 allows the latter to deform and thus avoids the deformations of the protuberances 20. When the attachment device 25 does not have flexible blades 252, if the adhesive expands, it is imprisoned in a very rigid attachment device 25, and will therefore deform the protuberances 20.

According to one embodiment, a through-hole 254 is formed in at least one recess 255. Advantageously, this hole 254 allows the adhesive to be injected after installation of the attachment device 25.

Advantageously, owing to their volume, the protuberances 20 prevent transmission of the deformations of the adhesive to either the stiffeners 10 of the honeycomb structure or to the skin 23 of the honeycomb structure 1. The stresses remain concentrated on the protuberances, the adhesive can therefore undergo aging without creating deformations of the honeycomb structure 1.

In the case of cylindrical protuberances 20, the local circular adhesive bonding offers a symmetry of the stresses which allows them to be cancelled. In this embodiment, the stresses of the adhesive are symmetrical and radial on each protuberance 20.

The invention just described can for example be used in the construction of mirrors for telescopes with a high or very high resolution. For this purpose, the present invention also relates to a mirror constructed with one embodiment of the honeycomb structure previously described. In this mirror, the reflecting surface can be formed by the skin 23 of the structure 1 or on the skin 23 of said honeycomb structure.

The invention claimed is:

1. A honeycomb structure comprising a front part and a rear part in which:
    the front part and the rear part are honeycomb structures composed of a skin and of stiffeners as a single component, said stiffeners being formed of intermeshing blades oriented substantially perpendicularly to said skin;
    the front part and the rear part comprise protuberances on the stiffeners on the face opposite to the skin, said protuberances being disposed on said front part and rear part in such a manner that each protuberance of the front part is located opposite a protuberance of the rear part when the two parts are superposed; and
    the front part and the rear part are assembled by means of an attachment device into which two opposing protuberances are inserted.

2. The honeycomb structure as claimed in claim 1, in which at least one protuberance is disposed at an intersection of at least two stiffeners.

3. The honeycomb structure as claimed in claim 1, in which at least one protuberance is bonded to the attachment device.

4. The honeycomb structure as claimed in claim 1, in which an adhesive joint is only distributed over a part of a periphery of the protuberances.

5. The honeycomb structure as claimed in claim 1, in which the protuberances are cylindrical stubs.

6. The honeycomb structure as claimed in claim 1, in which the attachment device is slotted at one of its ends at least.

7. The honeycomb structure as claimed in claim 1, in which the attachment device is a guide socket.

8. The honeycomb structure as claimed in claim 1, in which the attachment device is made of a nickel-iron alloy.

9. The honeycomb structure as claimed in claim 1, in which the attachment device is constructed with a ceramic material chosen from between silicon nitride and vitro-ceramic glass.

10. A mirror comprising a honeycomb structure as claimed in claim 1 in which a reflecting part is formed by or on the skin of said honeycomb structure.

\* \* \* \* \*